United States Patent
Kawaguchi et al.

(10) Patent No.: US 9,512,313 B2
(45) Date of Patent: Dec. 6, 2016

(54) THERMOPLASTIC ELASTOMER COMPOSITION

(75) Inventors: Koichi Kawaguchi, Kanagawa (JP); Yuichi Hara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1051 days.

(21) Appl. No.: 13/575,887

(22) PCT Filed: May 20, 2011

(86) PCT No.: PCT/JP2011/062146
§ 371 (c)(1),
(2), (4) Date: Jul. 27, 2012

(87) PCT Pub. No.: WO2012/026173
PCT Pub. Date: Mar. 1, 2012

(65) Prior Publication Data
US 2012/0301652 A1 Nov. 29, 2012

(30) Foreign Application Priority Data
Aug. 27, 2010 (JP) ................. 2010-190642

(51) Int. Cl.
| | | |
|---|---|---|
| C08L 77/02 | (2006.01) | |
| C08L 29/06 | (2006.01) | |
| C08L 19/00 | (2006.01) | |
| B32B 27/08 | (2006.01) | |
| B32B 1/08 | (2006.01) | |
| C08L 77/06 | (2006.01) | |
| B60C 1/00 | (2006.01) | |
| C08L 23/16 | (2006.01) | |
| C08L 23/08 | (2006.01) | |
| C08K 5/17 | (2006.01) | |

(52) U.S. Cl.
CPC ............ *C08L 77/02* (2013.01); *B60C 1/0008* (2013.04); *C08L 23/16* (2013.01); *C08L 77/06* (2013.01); *C08K 5/17* (2013.01); *C08L 23/0853* (2013.01); *Y10T 428/139* (2015.01); *Y10T 428/1393* (2015.01); *Y10T 428/3175* (2015.04)

(58) Field of Classification Search
CPC ........... Y10T 428/139; Y10T 428/1393; Y10T 428/3175; C08K 5/17; C08L 23/0853; C08L 77/02; C08L 77/06; C08L 23/0861; C08L 63/00; C08L 21/00; C08L 23/26;C08L 51/06; C08L 77/00; C08L 15/02; C08L 23/283; C08L 2205/035; C08L 25/08; C08L 29/04; C08L 2205/05
USPC ............ 428/36.9, 36.91, 476.3; 525/186, 57
See application file for complete search history.

(56) References Cited

U.S. PATENT DOCUMENTS

| | | | |
|---|---|---|---|
| 5,384,360 A * | 1/1995 | Richards | ............... C08L 71/123 524/508 |
| 5,910,544 A | 6/1999 | Ozawa et al. | |
| 6,079,465 A | 6/2000 | Takeyama et al. | |
| 2010/0036028 A1* | 2/2010 | Morooka | .............. B60C 1/0008 524/168 |
| 2010/0112257 A1* | 5/2010 | Morooka | ................ B32B 25/08 428/36.8 |
| 2010/0147432 A1 | 6/2010 | Morooka | |

FOREIGN PATENT DOCUMENTS

| | | |
|---|---|---|
| EP | 0696303 A1 | 2/1996 |
| EP | 1971496 A1 | 9/2008 |
| JP | 63-170460 A | 7/1988 |
| JP | 10-25375 A | 1/1989 |
| JP | 64-031864 | 2/1989 |
| JP | 4-159363 A | 6/1992 |
| JP | 8-259741 A | 10/1996 |
| JP | 10-114840 A | 5/1998 |
| JP | 2000-160024 A | 6/2000 |
| JP | 2007-031578 A | 2/2007 |
| JP | 2007-297525 A | 11/2007 |
| JP | 2009-155441 A | 7/2009 |
| JP | 2010-037465 A | 2/2010 |
| JP | 2010-132850 A | 6/2010 |
| WO | WO-9425526 A1 | 11/1994 |
| WO | WO-2007081323 A1 | 7/2007 |

* cited by examiner

*Primary Examiner* — Yan Lan
(74) *Attorney, Agent, or Firm* — Polsinelli PC

(57) ABSTRACT

Provided is a thermoplastic elastomer composition comprising a polyamide resin and a modified rubber, in which low temperature resistance is improved. The thermoplastic elastomer composition comprising the polyamide resin and the modified rubber having an acid anhydride group or an epoxy group is characterized in that the modified rubber having an acid anhydride group or an epoxy group is modified with a secondary amine. The secondary amine is preferably a compound having a structural formula: $R^1$—NH—$R^2$, in which $R^1$ is a linear alkyl group having 1 to 30 carbon atoms and $R^2$ is a hydrocarbon group having 1 to 30 carbon atoms or a hydrocarbon group having 1 to 30 carbon atoms and having a hydroxyl group, a sulfonyl group, a carbonyl group or an ether bond.

14 Claims, No Drawings

THERMOPLASTIC ELASTOMER COMPOSITION

CROSS REFERENCE TO RELATED APPLICATIONS

This application is a National Phase filing under 35 U.S.C. §371 of PCT/JP2011/062146 filed on May 20, 2011; and this application claims priority to Application No. 2010-190642 filed in Japan on Aug. 27, 2010 under 35 U.S.C. §119; the entire contents of all are hereby incorporated by reference.

TECHNICAL FIELD

The present invention relates to a thermoplastic elastomer composition including a polyamide resin and a modified rubber. Particularly, the present invention relates to a thermoplastic elastomer composition in which a modified rubber is dispersed in a polyamide resin matrix to improve the low temperature resistance (cyclic fatigue resistance) of the polyamide resin.

BACKGROUND ART

A thermoplastic elastomer composition prepared by dispersing a specific rubber elastomer component as a discontinuous phase in a specific thermoplastic resin matrix, in which the composition has a good balance between air permeability resistance and flexibility (JP 8-259741 A) is known.

In addition, it is known that a thermoplastic elastomer composition having more flexibility and excellent air permeability resistance by attaining a high elastomer component ratio by setting a melt viscosity ($\eta_m$) of a thermoplastic resin component, a melt viscosity ($\eta_d$) of an elastomer component in a thermoplastic elastomer composition and a solubility parameter difference ($\Delta$SP) between the elastomer component and the thermoplastic resin component in such a manner as to satisfy a specific relational expression, as well as a pneumatic tire using the thermoplastic elastomer composition for a gas permeation preventive layer (JP 10-25375 A) can be obtained.

Furthermore, a thermoplastic elastomer composition in which gas permeability resistance is greatly improved by the presence of a barrier resin composition having a phase structure dispersed flatly in a thermoplastic elastomer having a continuous phase of a thermoplastic resin and a dispersion phase of a rubber composition, and moreover, which has flexibility, oil resistance, cold resistance and heat resistance (JP 10-114840 A) is also known.

Furthermore, a thermoplastic elastomer composition in which an acid anhydride-modified ethylene-based modifier polymer is blended in an aliphatic polyamide resin modified with a layered silicate (JP 2000-160024 A) is also known.

SUMMARY OF INVENTION

Technical Problem

When a polyamide resin is blended with a Modified rubber having an acid anhydride group or an epoxy group, the polyamide resin reacts with the acid anhydride group or the epoxy group. Thus, blending of a large amount of a modified rubber extremely reduces fluidity in melting, which has caused significantly deteriorating film formability and low temperature resistance is still insufficient despite the high content of the modified rubber.

It is an object of the present invention to provide a thermoplastic elastomer composition in which a modified rubber excellent in low temperature resistance is dispersedly added in a polyamide resin matrix to improve the low temperature resistance (cyclic fatigue resistance) of the polyamide resin, in which the thermoplastic elastomer composition maintains fluidity even when a large amount of the modified rubber is added, so that film formation is possible, and also exhibits excellent low temperature resistance.

Solution to Problem

The present invention is a thermoplastic elastomer composition comprising a polyamide resin (A) and a modified rubber (B) having an acid anhydride group or an epoxy group, wherein the modified rubber (B) having an acid anhydride group or an epoxy group is modified with a secondary amine (C).

In the present invention, the secondary amine (C) is preferably a compound having a structural formula:

$R^1$—NH—$R^2$ in which at least one of $R^1$ and $R^2$ is a linear alkyl group having 1 to 30 carbon atoms.

In the present invention, the secondary amine (C) is preferably a compound having a structural formula:

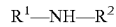

$R^1$—NH—$R^2$ in which $R^1$ is a linear alkyl group having 1 to 30 carbon atoms and $R^2$ is a hydrocarbon group having 1 to 30 carbon atoms or a hydrocarbon group having 1 to 30 carbon atoms and having a hydroxyl group, a sulfonyl group, a carbonyl group or an ether bond.

In the present invention, the modified rubber (B) having an acid anhydride group or an epoxy group is preferably obtained by melt-blending 100 parts by weight of a modified rubber having an acid anhydride group or an epoxy group and 0.1 to 5 parts by weight of the secondary amine (C).

In the present invention, the polyamide resin (A) is preferably a modified polyamide resin (A') obtained by melt-blending 100 parts by weight of a polyamide resin and 0.05 to 5 parts by weight of a compound (D) capable of bonding with a terminal amino group of the polyamide resin at a temperature equal to or higher than a melting point of the polyamide resin.

Preferably, the thermoplastic elastomer composition according to the present invention further includes an ethylene-vinyl alcohol copolymer (E).

In the present invention, the compound (D) capable of bonding with a terminal amino group of the polyamide resin is preferably a monofunctional epoxy compound.

In the present invention, the polyamide resin (A) is preferably nylon 6, nylon 66, or nylon 6/66.

In the present invention, a rubber forming the modified rubber (B) having an acid anhydride group or an epoxy group is preferably an ethylene-α-olefin copolymer or an ethylene-unsaturated carboxylic acid copolymer or a derivative thereof.

In the present invention, the thermoplastic elastomer composition preferably comprises 100 parts by weight of the polyamide resin (A) and 90 to 180 parts by weight of the modified rubber (B) having an acid anhydride group or an epoxy group.

When the thermoplastic elastomer composition of the present invention comprises an ethylene-vinyl alcohol copolymer (E), a weight ratio of the polyamide resin (A) to the ethylene-vinyl alcohol copolymer (E) is preferably 90/10 to 10/90, and the modified rubber (B) having an acid anhydride group or an epoxy group is contained preferably in an amount of 90 to 180 parts by weight based on 100 parts by weight in total of the polyamide resin (A) and the ethylene-vinyl alcohol copolymer (E).

In addition, the present invention is a laminate comprising at least one film made of the thermoplastic elastomer composition and at least one sheet made of a diene component-containing rubber composition.

Preferably, the laminate according to the present invention further comprises an adhesive layer.

In the laminate of the present invention, a polymer component of the rubber composition sheet preferably comprises 30 to 100% by weight of halogenated butyl rubber.

In addition, the present invention is a tire comprising a film made of the thermoplastic elastomer composition or the laminate.

In addition, the present invention is a hose comprising a film made of the thermoplastic elastomer composition or the laminate.

Advantageous Effects of Invention

According to the present invention, the thermoplastic elastomer composition comprising the polyamide resin (A) and the modified rubber (B) having an acid anhydride group or an epoxy group is modified with the secondary amine (C), whereby the low temperature resistance of the thermoplastic elastomer composition can be improved.

DESCRIPTION OF EMBODIMENTS

A thermoplastic elastomer composition according to the present invention comprises a polyamide resin (A) and a modified rubber (B) having an acid anhydride group or an epoxy group.

As the polyamide resin (A), nylon 6, nylon 66, nylon 46, nylon 11, nylon 12, nylon 610, nylon 612, nylon 6/66, nylon MXD6, and nylon 6T can be used alone or as a mixture thereof, although not limited to them. Among them, nylon 6, nylon 66, and nylon 6/66 are preferable in terms of the balance between cyclic fatigue resistance and gas barrier properties.

The modified rubber (B) used in the present invention has an acid anhydride group or an epoxy group. From the viewpoint of the compatibility with the polyamide resin, particularly preferably, the modified rubber (B) has an acid anhydride group.

As a rubber forming the modified rubber (B), there may be mentioned an ethylene-α-olefin copolymer or an ethylene-unsaturated carboxylic acid copolymer or a derivative thereof. Examples of the ethylene-α-olefin copolymer include an ethylene-propylene copolymer, an ethylene-butene copolymer, an ethylene-hexene copolymer and an ethylene-octene copolymer. Examples of the ethylene-unsaturated carboxylic acid copolymer or the derivative thereof include an ethylene-acrylate copolymer, an ethylene-methacrylate copolymer, an ethylene-methyl acrylate copolymer, and an ethylene-methyl methacrylate copolymer.

The modified rubber having an acid anhydride group can be produced, for example, by reaction of an acid anhydride and peroxide with rubber. The content of the acid anhydride group in the modified rubber having an acid anhydride group is preferably 0.01 to 1 mol/kg, and more preferably 0.05 to 0.5 mol/kg. If the content of the acid anhydride group is too low, dispersion of the modified rubber is deteriorated, whereas if it is too large, processability is deteriorated. In addition, the modified rubber having an acid anhydride group is commercially available, so that its commercially available product can be used. Examples of the commercially available product of the rubber include a maleic anhydride modified ethylene-propylene copolymer (TAFMER® MP-0620) and a maleic anhydride modified ethylene-butene copolymer (TAFMER® MP-7020), manufactured by Mitsui Chemicals, Inc.

The modified rubber having an epoxy group can be produced, for example, by copolymerization of glycidyl methacrylate with rubber. Although the copolymerization ratio is not limited, for example, the amount of glycidyl methacrylate is 10 to 50 parts by weight based on 100 parts by weight of rubber. The content of the epoxy group in the modified rubber having an epoxy group is preferably 0.01 to 5 mol/kg, and more preferably 0.1 to 1.5 mol/kg. If the content of the epoxy group is too low, dispersion of the modified rubber is deteriorated, whereas if it is too large, processability is deteriorated. In addition, the modified rubber having an epoxy group is commercially available, so that its commercially available product can be used. Examples of the commercially available product of the rubber include an epoxy modified ethylene-methyl acrylate copolymer (ESPLENE® EMA2752) manufactured by Sumitomo Chemical Co., Ltd.

A particularly preferable modified rubber (B) is an ethylene-α-olefin copolymer graft-modified with an anhydride group. Examples thereof include the above-mentioned maleic anhydride modified ethylene-propylene copolymer (TAFMER® MP-0620) and maleic anhydride modified ethylene-butene copolymer (TAFMER® MH-7020) manufactured by Mitsui Chemicals, Inc.

Regarding a ratio of the polyamide resin (A) to the modified rubber (B) in the thermoplastic resin elastomer composition, the modified rubber (B) is contained preferably in an amount of 90 to 180 parts by weight, and more preferably in an amount of 95 to 160 parts by weight based on 100 parts by weight of the polyamide resin (A). If the percentage of the modified rubber (B) is too low, the low temperature resistance is deteriorated, whereas if it is too high, fluidity in melting extremely reduces, which significantly deteriorates film formability. In the thermoplastic resin elastomer composition of the present invention, preferably, the polyamide resin (A) forms a continuous phase and the modified rubber (B) forms a dispersion phase.

In the thermoplastic elastomer composition of the present invention, the modified rubber (B) is modified with a secondary amine (C). Modification with the secondary amine (C) allows for the improvement of the low temperature resistance of the thermoplastic elastomer composition. Modification with the secondary amine (C) can be performed by melt-blending the modified rubber having an acid anhydride group or an epoxy group together with the secondary amine (C). Melt-blending temperature is equal to or higher than a melting point of the polyamide resin (A), but preferably is a temperature that is 20° C. higher than the melting point of the polyamide resin (A), for example, a temperature of 200 to 250° C. Melt-blending time is usually 1 to 10 minutes, and preferably 2 to 5 minutes.

The secondary amine (C) has the following structural formula: $R^1$—NH—$R^2$.

Preferably, at least one of $R^1$ and $R^2$ is a linear alkyl group having 1 to 30 carbon atoms.

More preferably, $R^1$ is a linear alkyl group having 1 to 30 carbon atoms and $R^2$ is a hydrocarbon group having 1 to 30 carbon atoms or a hydrocarbon group having 1 to 30 carbon atoms and having a hydroxyl group, a sulfonyl group, a carbonyl group or an ether bond.

$R^1$ is a linear alkyl group having 1 to 30 carbon atoms, preferably a linear alkyl group having 6 to 26 carbon atoms, more preferably a dodecyl group (a lauryl group), a tetradecyl group (a myristyl group), a hexadecyl group (a palmityl group), an octadecyl group (a stearyl group), or an icosyl group. Using a secondary amine having a relatively long chain linear alkyl group has great effect on the improvement of low temperature resistance of the thermoplastic elastomer composition.

$R^2$ is a hydrocarbon group having 1 to 30 carbon atoms and may have a hydroxyl group (—OH), a sulfonyl group (>$SO_2$), a carbonyl group (>C=O) or an ether bond (—O—). The hydrocarbon group may be linear, branched, or ringed, and may be saturated or unsaturated. The number of carbon atoms is preferably 1 to 26, and more preferably 2 to 18. $R^2$ may be the same as or different from $R^1$. $R^2$ is preferably an alkyl group having 1 to 30 carbon atoms or an alkyl group having 1 to 30 carbon atoms substituted with a hydroxyl group, and more preferably is a hydroxymethyl group, a hydroxyethyl group, a hydroxypropyl group, or a hydroxyhexadecyl group. By using a secondary amine having a hydroxyl group, a sulfonyl group, a carbonyl group, an amide bond such as an ether bond, or a functional group capable of forming hydrogen bond with a hydroxyl group, an interface between the polyamide resin forming a matrix and a modified rubber dispersion phase is reinforced by the hydrogen bond. Accordingly, the low temperature resistance of the thermoplastic elastomer composition can be improved without deteriorating film formability.

Preferable specific examples of the secondary amine (C) include N-hydroxyethyl-laurylamine and dialkyl amine (R—NH—R', in which R and R' are each an alkyl group having 12 to 20 carbon atoms).

Modification with the secondary amine (C) can be performed by melt-blending the modified rubber having an acid anhydride group or an epoxy group together with the secondary amine (C). The method for melt-blending the modified rubber having an acid anhydride group or an epoxy group and the secondary amine (C) is not specifically limited. For example, the modified rubber having an acid anhydride group or an epoxy group and the secondary amine (C) are fed in a twin-screw kneader to be melt-blended at a temperature equal to or higher than the melting point of the polyamide resin, preferably at a temperature that is 20° C. higher than the melting point thereof, for example, at 230° C. Melt-blending time is, for example, 1 to 10 minutes, and preferably 2 to 5 minutes.

The amount of the secondary, amine (C) is preferably 0.1 to 5 parts by weight, and more preferably 0.5 to 3 parts by weight based on 100 parts by weight of the modified rubber having an acid anhydride group or an epoxy group. If the amount of the secondary amine (C) is too low, any significant improvement in the resistance cannot be achieved. Conversely, if the amount of the secondary amine (C) is too high, unreacted amine remains.

Preferably, the polyamide resin (A) used in the present invention is a modified polyamide resin (A') obtained by melt-blending 100 parts by weight of the polyamide resin and 0.05 to 5 parts by weight of a compound (D) capable of bonding with a terminal amino group of the polyamide resin at a temperature equal to or higher than the melting point of the polyamide resin.

Examples of the compound (D) capable of bonding with a terminal amino group of the polyamide resin include monofunctional epoxy compounds, isocyanate group-containing compounds, acid anhydride group-containing compounds, and halogenated alkyl group-containing compounds. From the viewpoint of reactivity with a terminal amino group of the polyamide resin, monofunctional epoxy compounds are preferable.

Examples of the monofunctional epoxy compounds include ethylene oxide, epoxy propane, 1,2-epoxybutane, 2,3-epoxybutane, 3-methyl-1,2-epoxybutane, 1,2-epoxypentane, 4-methyl-1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 5-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-propyl-2,3-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 6-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-1-hexanol, 3,4-epoxy-5-methyl-2-hexanol, 3,4-epoxy-5,5-dimethyl-2-hexanol, 3,4-epoxy-3-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-3-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-5-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane, 1,2-epoxycyclododecane, 3,4-epoxycyclopentene, 3,4-epoxycyclohexene, 3,4-epoxycycloheptene, 3,4-epoxycyclooctane, 3,4-epoxycyclononene, 1,2-epoxycyclodecene, 1,2-epoxycycloundecene, 1,2-epoxycyclododecene, 1-butoxy-2,3-epoxypropane, 1-allyloxy-2,3-epoxypropane, polyethylene glycol butyl glycidyl ether, 2-ethylhexyl glycidyl ether, phenyl glycidyl ether and p-sec-butyl phenyl glycidyl ether. From the viewpoint of the compatibility of the polyamide resin, epoxy compounds having 3 to 20 carbon atoms, and preferably 3 to 13 carbon atoms, and having ether and/or a hydroxyl group are in particular preferable.

The method for melt-blending the polyamide resin with the compound (D) capable of bonding with a terminal amino group of the polyamide resin is not specifically limited. For example, the polyamide resin and the compound (D) capable of bonding with a terminal amino group of the polyamide resin are fed in a twin-screw kneader to be melt-blended at a temperature equal to or higher than the melting point of the polyamide resin, preferably at a temperature that is 20° C. higher than the melting point thereof, for example, at 240° C. Melt-blending time is, for example, 1 to 10 minutes, and preferably 2 to 5 minutes.

When a monofunctional epoxy compound is melt-blended as the compound (D) capable of bonding with a terminal amino group of the polyamide resin, the monofunctional epoxy compound:

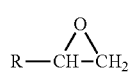

(1)

bonds with a terminal amino group of the polyamide resin, and, for example, the terminal amino group changes as follows.

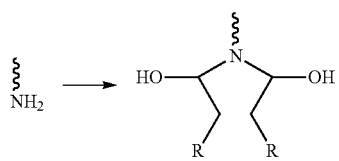

(2)

As a result of the reaction, a part of or all of the terminal amino groups of the polyamide resin changes to another group. Accordingly, even when a large amount of the modified rubber (B) having an acid anhydride group or an epoxy group is added, the fluidity can be maintained, thus allowing for film formation.

The amount of the compound (D) capable of bonding with a terminal amino group of the polyamide resin to be used for modification of the polyamide resin is 0.05 to 5 parts by weight, and preferably 1 to 3 parts by weight based on 100 parts by weight of the polyamide resin. If the amount of the compound (D) capable of bonding with a terminal amino group of the polyamide resin is too low, fluidity improving effect is low in the case of addition of the large amount of the modified rubber (B), which is thus undesirable. Conversely, if it is too high, it is also undesirable since the low temperature resistance (cyclic fatigue resistance) of the polyamide resin is deteriorated.

Preferably, the thermoplastic resin elastomer composition of the present invention further comprises an ethylene-vinyl alcohol copolymer (E). Adding the ethylene-vinyl alcohol copolymer (E) (hereinafter referred to also as "EVOH") can improve the gas barrier properties of the thermoplastic resin elastomer composition. The ethylene-vinyl alcohol copolymer (E) to be used is not specifically limited and can be a commercially available product, such as EVAL manufactured by Kuraray Co., Ltd., and SOARNOL manufactured by Nippon Synthetic Chemical Industry Co., Ltd.

When the thermoplastic resin elastomer composition of the present invention comprises the ethylene-vinyl alcohol copolymer (E), a weight ratio of the polyamide resin (A) to the ethylene-vinyl alcohol copolymer (E) is preferably 90/10 to 10/90, and more preferably 80/20 to 20/80. If the content of the ethylene-vinyl alcohol copolymer (E) is small, little improvement can be seen in the gas barrier properties, and conversely if it is large, the low temperature resistance is extremely deteriorated, which is thus undesirable.

When the thermoplastic resin elastomer composition of the present invention comprises the ethylene-vinyl alcohol copolymer (E), the amount of the modified rubber (B) to be added is preferably 90 to 180 parts by weight, and more preferably 95 to 160 parts by weight based on 100 parts by weight in total of the polyamide resin (A) and the ethylene-vinyl alcohol copolymer (E). If the ratio of the modified rubber (B) is too small, the low temperature resistance is deteriorated, and conversely if it is too large, fluidity in melting extremely reduces, which significantly deteriorates film formability.

The thermoplastic resin elastomer composition of the present invention can be produced by melt-blending the polyamide resin (A) and the modified rubber (B). When the thermoplastic resin elastomer composition of the present invention comprises the ethylene-vinyl alcohol copolymer (E), the thermoplastic resin elastomer composition of the invention can be produced by melt-blending the polyamide resin (A), the ethylene-vinyl alcohol copolymer (E), and the modified rubber (B).

Additionally, without using the modified rubber (B) previously modified with the secondary amine (C), the thermoplastic elastomer composition of the present invention can also be produced by melt-blending the polyamide resin (A), a modified rubber (hereinafter referred to also as "modified rubber ($B_0$)") having an acid anhydride group or an epoxy group, which has not been modified with the secondary amine (C), and the secondary amine (C). When the thermoplastic elastomer composition of the present invention comprises the ethylene-vinyl alcohol copolymer (E), the thermoplastic elastomer composition thereof can also be produced by melt-blending the polyamide resin (A), the ethylene-vinyl alcohol copolymer (E), the modified rubber ($B_0$), and the secondary amine (C).

The timing of addition of the secondary amine (C) may be simultaneous with the melt-blending of the polyamide resin (A) and the modified rubber ($B_0$) or after the melt-blending thereof. In other words, the polyamide resin (A), the modified rubber ($B_0$), and the secondary amine (C) may be simultaneously melt-blended, or after the polyamide resin (A) and the modified rubber ($B_0$) are melt-blended and then the modified rubber ($B_0$) is sufficiently dispersed, the secondary amine (C) may be added to be further melt-blended. Preferably, when the modified rubber ($B_0$) is sufficiently dispersed after the melt-blending of the polyamide resin (A) and the modified rubber ($B_0$), the secondary amine (C) is added to be further melt-blended.

Melt-blending temperature is equal to or higher than the melting point of the polyamide resin, but preferably it is a temperature that is 20° C. higher than the melting point of the polyamide resin, for example, 200 to 250° C. Melt-blending time is usually 1 to 10 minutes, and more preferably 2 to 5 minutes.

In cases where the modified polyamide resin (A') is used as the polyamide resin (A), the modified polyamide resin (A') is prepared by previously melt-blending 100 parts by weight of the polyamide resin and 0.05 to 5 parts by weight of the compound (D) capable of bonding with a terminal amino group of the polyamide resin. Then, the modified polyamide resin (A') can be melt-blended together with the modified rubber (B) previously modified with the secondary amine (C) or the modified polyamide resin (A') can be melt-blended together with the modified rubber ($B_0$) and the secondary amine (C) to produce the thermoplastic elastomer composition of the present invention.

When the thermoplastic elastomer composition of the present invention comprises the ethylene-vinyl alcohol copolymer (E), preferably, the ethylene-vinyl alcohol copolymer (E) is added simultaneously with the polyamide resin (A) or the modified polyamide resin (A').

A typical method for producing the thermoplastic elastomer composition of the present invention is, for example, as follows.

First, the polyamide resin and the compound (D) capable of bonding with a terminal amino group of the polyamide resin are kneaded in a twin-screw kneader at a predetermined temperature of 200 to 250° C. for 1 to 10 minutes to prepare the modified polyamide resin (A'). Next, the prepared modified polyamide resin (A') and the modified rubber ($B_0$) are fed in the twin-screw kneader with the predetermined temperature of 200 to 250° C. After dispersion of the modified rubber ($B_0$), the secondary amine (C) is fed to modify the modified rubber ($B_0$), and finally, another additive(s) is(are) added.

When the thermoplastic elastomer composition of the present invention comprises the ethylene-vinyl alcohol copolymer (E), for example, the polyamide resin and the compound (D) capable of bonding with a terminal amino group of the polyamide resin are kneaded in the twin-screw kneader at the predetermined temperature of 200 to 250° for 1 to 10 minutes to prepare the modified polyamide resin (A'). Next, the prepared modified polyamide resin (A'), the ethylene-vinyl alcohol copolymer (E), and the modified rubber ($B_0$) are fed in the twin-screw kneader with the predetermined temperature of 200 to 250°. When the modified rubber ($B_0$) is dispersed, the secondary amine (C) is fed to modify the modified rubber ($B_0$), and finally other additives are added.

To the thermoplastic elastomer composition of the present invention, in addition to the above-described components, there can be added various kinds of additives commonly added in resin and rubber compositions, including a reinforcing agent (filler) such as carbon black or silica, a vulcanizing agent or a cross-linking agent, a vulcanization accelerator or a cross-linking accelerator, a plasticizer, various kinds of oils and an aging preventing agent. The amounts of these additives can be set to conventionally common additive amounts as long as the amounts thereof do not depart from the intended purpose of the invention.

The thermoplastic elastomer composition of the present invention can be formed into a film by a T-die equipped extruder, an inflation molding apparatus, or the like. The film can be suitably used as the inner liners of pneumatic tires because of its excellent gas barrier properties, heat resistance and bending fatigue resistance. Additionally, the film can be laminated with a sheet made of a diene component-containing rubber composition to form a laminate.

A laminate according to the present invention comprises at least one film made of the thermoplastic resin component and at least one sheet made of the diene component-containing rubber composition. Examples of rubber forming the diene component-containing rubber composition include natural rubber, emulsion-polymerized styrene-butadiene rubber, solution-polymerized styrene-butadiene rubber, high cis-butadiene rubber, low cis-butadiene rubber, isoprene rubber, acrylonitrile butadiene rubber, hydrogenated nitrile rubber, butyl rubber, halogenated butyl rubber and chloroprene rubber. Among them, halogenated butyl rubber is preferable in that, by application of heat, it directly adheres to the film made of the thermoplastic elastomer composition obtained by the present invention. Preferably, a polymer component of the rubber composition contains 30 to 100% by weight of halogenated butyl rubber. If the content of the halogenated butyl rubber is low, it cannot directly adhere to the film made of the thermoplastic elastomer composition of the present invention by the application of heat, so that adhesion via an adhesive or the like is needed, which is undesirable.

Preferably, the laminate of the present invention further comprises an adhesive layer. The adhesive layer is preferably provided on the rubber composition sheet. There is an advantage that providing the adhesive layer can improve bondability and adhesion with the rubber composition sheet in a lamination step. Examples of an adhesive forming the adhesive layer include blended products of polymers having a functional group that reacts with the polyamide resin (A) or the modified polyamide resin (A') or the modified rubber (B) and tackifying resins. Among them, preferable are blended products of epoxidized styrene-butadiene-styrene block copolymers and terpene resins.

In addition, to the diene-containing rubber composition, in addition to the above-described components, various kinds of additives commonly added to resin and rubber compositions, including a reinforcing agent (filler) such as carbon black or silica, a vulcanizing agent or a cross-linking agent, a vulcanization accelerator or a cross-linking accelerator, a plasticizer, various kinds of oils and an aging preventing agent can be added. The amounts of these additives to be added can be set to conventionally common additive amounts as long as the amounts thereof do not depart from the intended purpose of the invention.

A tire according to the present invention is a tire comprising the film made of the thermoplastic elastomer composition or the laminate, and preferably is a pneumatic tire. The tire can be produced by a conventional method. For example, in cases where the film made of the thermoplastic elastomer composition of the present invention is used as an inner liner of a pneumatic tire, the thermoplastic elastomer composition thereof is previously extruded into a film form having a predetermined width and a predetermined thickness to be attached onto a tire molding drum in a cylindrical form. Thereon, material members used in usual tire production are sequentially attached and laminated, such as a carcass layer, a belt layer, and a tread layer made of unvulcanized rubber, and then the drum is pulled out to obtain a green tire. Next, by heat vulcanization of the green tire according to a usual method, an intended pneumatic tire can be produced.

A hose according to the present invention is a hose comprising the film of the thermoplastic elastomer composition or the laminate. The method for producing the hose by using the thermoplastic elastomer composition of the present invention can be a conventional method. For example, the hose can be produced as follows. First, using pellets of the thermoplastic elastomer composition of the present invention, the thermoplastic elastomer composition is extruded on a mandrel where a release agent has been previously applied, by a crosshead extrusion method using a resin extruder, so as to form an inner tube. Then, on the inner tube, an inner-tube outside layer may be formed by extruding another thermoplastic elastomer composition of the present invention or a common thermoplastic rubber composition. Next, if needed, an adhesive is applied on the inner tube by spray or the like. Furthermore, a reinforcing thread or a reinforcing steel wire is braided on the inner tube using a braiding machine. If needed, after applying the adhesive on the reinforcement layer for adhesion with an outer tube, the thermoplastic elastomer composition of the present invention or another common thermoplastic rubber composition is similarly extruded by the crosshead resin extrusion machine to form the outer tube. Finally, the mandrel is pulled out to obtain the hose. Examples of the adhesive applied on the inner tube or the reinforcement layer include those based on isocyanate, urethane, phenol resin, resorcin, chlorinated rubber, and HRH, and particularly preferable are isocyanate-based and urethane-based adhesives.

EXAMPLES (1) Raw Materials

The following raw materials were used.
Polyamide resin: UBE NYLON 1033B manufactured by Ube Industries, Ltd.
Ethylene-vinyl alcohol copolymer: "SOARNOL®" H4412B manufactured by Nippon Synthetic Chemical Industry Co., Ltd.
Modified rubber: "TAFMER®" MH-7020 manufactured by Mitsui Chemicals, Inc.
N-hydroxyethyl-laurylamine: "Nymeen®" L-201 manufactured by NOF Corporation.
Dialkylamine: "ARMIN" 2HT (alkyl group composition: $C_{12}$=1%, $C_{13}$=3%, $C_{16}$=30%, $C_{18}$=65%, and $C_{20}$=1%) manufactured by Lion Akzo Co., Ltd.
3,3'-diaminodiphenyl sulfone: 3,3'-DAS manufactured by Konishi Chemical Industry Co., Ltd.

(2) Preparation of Thermoplastic Elastomer Compositions

The polyamide resin and the modified rubber were fed into a twin-screw kneader at a weight ratio shown in Table 1 to melt-blend at a kneader temperature of 220° C. When the modified rubber was dispersed, N-hydroxyethyl-laurylamine, dialkylamine, or 3,3'-diaminodiphenyl sulfone was fed in amounts shown in Table 1 to be melt-blended. Then, each resultant product was continuously extruded into a strand form from an extruder, cooled down with water, and then cut with a cutter to obtain each pellet-shaped thermoplastic elastomer composition.

Furthermore, the polyamide resin, the ethylene-vinyl alcohol copolymer, and the modified rubber were fed in a weight ratio shown in Table 2 in the twin-screw kneader to melt-blend at the kneader temperature of 220° C. When the modified rubber was dispersed, N-hydroxyethyl-laurylamine, dialkylamine, or 3,3'-diaminodiphenyl sulfone was fed in amounts shown in Table 2 to be melt-blended. Then, each resultant product was continuously extruded into a strand form from the extruder, cooled down with water, and then cut with a cutter to obtain each pellet-shaped thermoplastic elastomer composition.

(3) Method for Evaluating Thermoplastic Elastomer Compositions

The low temperature resistances of the obtained thermoplastic elastomer compositions were evaluated by a −35° C. constant strain test.

[−35° C. Constant Strain Test]

The pellet-shaped thermoplastic elastomer compositions were formed into sheets with a mean thickness of 1 mm by using a 40-mmφ single screw extruder equipped with a 200 mm-width T-die (manufactured by Pla Giken Co., Ltd.) under extrusion conditions of extrusion temperatures: C1/C2/C3/C4/die=200/210/230/235/235° C., a cooling roll temperature of 50° C., and a take-up speed of 0.7 m/minute. Then, the sheets were cut with a JIS #3 dumbbell and subjected to repetitive deformation of 40% under a temperature of −35° C. Measurements were performed five times to calculate a mean value of the numbers of fractures, which was determined as a mean number of fractures. The larger the mean number of fractures, the higher the low temperature resistance.

(4) Evaluation Results of Thermoplastic Elastomer Compositions

Tables 1 and 2 show evaluation results.

TABLE 1

|  | Comp. Ex. 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Polyamide resin (A) | 100.0 | 100.0 | 100.0 | 100.0 | 100.0 |  | 100.0 | 100.0 | 100.0 |
| Modified rubber (B) | 142.1 | 142.1 | 142.1 | 142.1 | 142.1 | 142.1 | 142.1 | 142.1 | 142.1 |
| N-hydroxyethyl-laurylamine |  | 0.5 | 1.0 | 2.0 | 3.0 |  |  |  |  |
| Dialkylamine |  |  |  |  |  | 0.5 | 1.0 | 2.0 | 3.0 |
| Mean number of fractures under −35° C. constant strain test [1,000 times] | 570 | 760 | 1050 | 1250 | 1400 | 620 | 710 | 770 | 820 |

TABLE 2

|  | Comp. Ex. 2 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Polyamide resin (A) | 40.4 | 40.4 | 40.4 | 40.4 | 40.4 | 40.4 | 40.4 | 40.4 | 40.4 |
| EVOH (E) | 59.6 | 59.6 | 59.6 | 59.6 | 59.6 | 59.6 | 59.6 | 59.6 | 59.6 |
| Modified rubber (B) | 143.4 | 143.4 | 143.4 | 143.4 | 143.4 | 143.4 | 143.4 | 143.4 | 143.4 |

TABLE 2-continued

|  | Comp. Ex. 2 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| N-hydroxyethyl-laurylamine |  | 0.5 | 1.0 | 2.0 | 3.0 |  |  |  |  |
| Dialkylamine |  |  |  |  |  | 0.5 | 1.0 | 2.0 | 3.0 |
| Mean number of fractures under −35° C. constant strain test [1,000 times] | 450 | 600 | 827 | 1000 | 1100 | 490 | 560 | 610 | 650 |

In Comparative Example 1, no secondary amine was added, i.e., the modified rubber was not modified with any secondary amine.

In Examples 1 to 8 (thermoplastic elastomer compositions according to the present invention), as compared to Comparative Example 1, the mean numbers of fractures under the −35° C. Constant Strain Test are larger, so that the low temperature resistances are excellent.

In Comparative Example 2, when a matrix of the thermoplastic elastomer composition included the polyamide resin and the ethylene-vinyl alcohol copolymer, no secondary amine was added, i.e., the modified rubber was not modified with any secondary amine.

In Examples 9 to 16 (thermoplastic elastomer compositions according to the present invention), as compared to Comparative Example 2, the mean numbers of fractures under the −3.5° C. Constant Strain Test are larger, so that the low temperature resistances are excellent.

INDUSTRIAL APPLICABILITY

The thermoplastic elastomer composition according to the present invention can be used as various kinds of hoses, in addition to tires, in particular pneumatic tires, and other rubber products relating to permeability control of various kinds of gases (fumes, air, and the like), for example, also as laminate materials used for fenders, rubber bags, fuel tanks, and the like. The thermoplastic elastomer composition of the present invention is particularly suited for use as inner liners of pneumatic tires.

The invention claimed is:

1. A thermoplastic elastomer composition comprising a polyamide resin (A) and a modified rubber (B) having an acid anhydride group or an epoxy group, wherein the modified rubber (B) having an acid anhydride group or an epoxy group is modified with a secondary amine (C), and the secondary amine (C) is a compound having a structural formula:

in which $R^1$ is a linear alkyl group having 1 to 30 carbon atoms and $R^2$ is a hydrocarbon group having 1 to 30 carbon atoms and having a hydroxyl group, a sulfonyl group, a carbonyl group or an ether bond.

2. The thermoplastic elastomer composition according to claim 1, wherein the modified rubber (B) having an acid anhydride group or an epoxy group is obtained by melt-blending 100 parts by weight of a modified rubber having an acid anhydride group or an epoxy group and 0.1 to 5 parts by weight of the secondary amine (C).

3. The thermoplastic elastomer composition according to claim 1, further comprising an ethylene-vinyl alcohol copolymer (E).

4. The thermoplastic elastomer composition according to claim 1, wherein the polyamide resin (A) is a modified polyamide resin (A') obtained by melt-blending 100 parts by weight of a polyamide resin and 0.05 to 5 parts by weight of a compound (D) capable of bonding with a terminal amino group of the polyamide resin at a temperature equal to or higher than a melting point of the polyamide resin.

5. The thermoplastic elastomer composition according to claim 4, wherein the compound (D) capable of bonding with a terminal amino group of the polyamide resin is a monofunctional epoxy compound.

6. The thermoplastic elastomer composition according claim 1, wherein the polyamide resin (A) is nylon 6, nylon 66, or nylon 6/66.

7. The thermoplastic elastomer composition according to claim 1, wherein a rubber forming the modified rubber (B) having an acid anhydride group or an epoxy group is an ethylene-α-olefin copolymer or an ethylene-unsaturated carboxylic acid copolymer or a derivative thereof.

8. The thermoplastic elastomer composition according to claim 1, wherein the thermoplastic elastomer composition comprises 100 parts by weight of the polyamide resin (A) and 90 to 180 parts by weight of the modified rubber (B) having an acid anhydride group or an epoxy group.

9. The thermoplastic elastomer composition according to claim 3, wherein a weight ratio of the polyamide resin (A) to the ethylene-vinyl alcohol copolymer (E) is 90/10 to 10/90, and the modified rubber (B) having an acid anhydride group or an epoxy group is contained in an amount of 90 to 180 parts by weight based on 100 parts by weight in total of the polyamide resin (A) and the ethylene-vinyl alcohol copolymer (E).

10. A laminate comprising at least one film made of the thermoplastic elastomer composition according to claim 1 and at least one sheet made of a diene component-containing rubber composition.

11. The laminate according to claim 10 further comprising an adhesive layer.

12. The laminate according to claim 10, wherein a polymer component of the rubber composition comprises 30 to 100% by weight of a halogenated butyl rubber.

13. A tire comprising a film made of a thermoplastic elastomer composition comprising a polyamide resin (A) and a modified rubber (B) having an acid anhydride group or an epoxy group, wherein the modified rubber (B) having an acid anhydride group or an epoxy group is modified with a secondary amine (C), and the secondary amine (C) is a compound having a structural formula:

in which $R^1$ is a linear alkyl group having 1 to 30 carbon atoms and $R^2$ is a hydrocarbon group having 1 to 30 carbon atoms and having a hydroxyl group, a sulfonyl group, a carbonyl group or an ether bond or the laminate according to claim 10.

14. A hose comprising a film made of a thermoplastic elastomer composition comprising a polyamide resin (A) and a modified rubber (B) having an acid anhydride group or an epoxy group, wherein the modified rubber (B) having an acid anhydride group or an epoxy group is modified with a secondary amine (C), and the secondary amine (C) is a compound having a structural formula:

$R^1$—NH—$R^2$ in which $R^1$ is a linear alkyl group having 1 to 30 carbon atoms and $R^2$ is a hydrocarbon group having 1 to 30 carbon atoms and having a hydroxyl group, a sulfonyl group, a carbonyl group or an ether bond or the laminate according to claim 10.

* * * * *